(12) United States Patent
Kim et al.

(10) Patent No.: US 9,396,281 B2
(45) Date of Patent: Jul. 19, 2016

(54) ACTIVITIES OPERATING ON STRUCTURED DATA

(75) Inventors: Jane T. Kim, Seattle, WA (US); Miladin Pavlicic, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1527 days.

(21) Appl. No.: 12/190,639

(22) Filed: Aug. 13, 2008

(65) Prior Publication Data

US 2010/0042937 A1 Feb. 18, 2010

(51) Int. Cl.
*G06F 3/048* (2013.01)
*G06F 17/30* (2006.01)

(52) U.S. Cl.
CPC .................. *G06F 17/30905* (2013.01)

(58) Field of Classification Search
CPC ............... G06F 17/30899; G06F 2209/541; G06F 2209/545
USPC ................................................. 715/760, 764
See application file for complete search history.

(56) References Cited

U.S. PATENT DOCUMENTS

| | | | |
|---|---|---|---|
| 5,818,446 A | 10/1998 | Bertram | |
| 5,859,636 A | 1/1999 | Pandit | |
| 6,072,486 A | 6/2000 | Sheldon et al. | |
| 6,377,286 B1 * | 4/2002 | Hochmuth | 715/810 |
| 6,380,959 B1 * | 4/2002 | Wang et al. | 715/853 |
| 6,839,650 B2 | 1/2005 | Sutton et al. | |
| 6,963,930 B2 | 11/2005 | Halpert et al. | |
| 7,013,308 B1 * | 3/2006 | Tunstall-Pedoe | 707/709 |
| 7,032,211 B1 | 4/2006 | Janzig et al. | |
| 7,243,298 B2 | 7/2007 | Yozell-Epstein et al. | |
| 7,243,309 B2 | 7/2007 | Koay | |
| 7,343,625 B1 | 3/2008 | Zaidi | |
| 7,373,300 B1 | 5/2008 | Bangalore et al. | |
| 7,395,317 B2 | 7/2008 | Naick et al. | |
| 7,428,570 B2 | 9/2008 | Nobili | |
| 7,487,446 B2 | 2/2009 | Hargarten et al. | |
| 7,581,194 B2 | 8/2009 | Iwema et al. | |
| 7,711,743 B2 * | 5/2010 | Cavagnaro et al. | 707/769 |
| 7,721,228 B2 | 5/2010 | Burke et al. | |
| 7,949,230 B2 | 5/2011 | Tsukamoto | |
| 8,032,482 B2 | 10/2011 | Rosenberg et al. | |
| 8,117,542 B2 | 2/2012 | Radtke et al. | |

(Continued)

OTHER PUBLICATIONS

Remy Sharp, "Safari Gets a Proper Microformats Extension", Published—Nov. 25, 2007, pp. 3.

(Continued)

*Primary Examiner* — Peiyong Weng
(74) *Attorney, Agent, or Firm* — Bryan Webster; Raghu Chinagudabha; Micky Minhas

(57) ABSTRACT

Various embodiments can enable a webpage publisher to describe structured data on a webpage in a manner that enables a Web browser to intelligently present activities that pertain to user selections relative to the structured data appearing on the webpage. In at least some embodiments, a webpage publisher can provide markup that identifies structured data on a webpage. A service provider can provide a representation that describes the types of structured data in which it is interested, and how to handle the structured data responsive to a user selection. The Web browser can then use the markup in the webpage and the service provider's representation to identify and present activities associated with structured data selected by the user.

20 Claims, 5 Drawing Sheets

(56) References Cited

U.S. PATENT DOCUMENTS

| | | | |
|---|---|---|---|
| 8,381,133 | B2 | 2/2013 | Iwema et al. |
| 8,464,168 | B2 | 6/2013 | Bump et al. |
| 2002/0080154 | A1 | 6/2002 | Matthews, III et al. |
| 2002/0085224 | A1 | 7/2002 | Price et al. |
| 2002/0186257 | A1 | 12/2002 | Cadiz et al. |
| 2003/0097233 | A1 | 5/2003 | Sutton et al. |
| 2003/0164862 | A1 | 9/2003 | Cadiz et al. |
| 2003/0187936 | A1* | 10/2003 | Bodin et al. .................. 709/206 |
| 2004/0157202 | A1 | 8/2004 | Hopkins et al. |
| 2004/0243942 | A1 | 12/2004 | Cortright |
| 2004/0263475 | A1 | 12/2004 | Wecker et al. |
| 2005/0005248 | A1 | 1/2005 | Rockey et al. |
| 2005/0039141 | A1 | 2/2005 | Burke et al. |
| 2005/0086304 | A1 | 4/2005 | Naick et al. |
| 2005/0102629 | A1 | 5/2005 | Chen et al. |
| 2005/0108052 | A1 | 5/2005 | Omaboe |
| 2005/0125741 | A1 | 6/2005 | Clow et al. |
| 2005/0198394 | A1 | 9/2005 | Waldorf et al. |
| 2005/0240902 | A1 | 10/2005 | Bunker et al. |
| 2006/0036568 | A1 | 2/2006 | Moore et al. |
| 2006/0036945 | A1 | 2/2006 | Radtke et al. |
| 2006/0069990 | A1 | 3/2006 | Yozell-Epstein et al. |
| 2006/0074869 | A1 | 4/2006 | Rosenberg et al. |
| 2006/0101046 | A1 | 5/2006 | Hargarten et al. |
| 2006/0112141 | A1 | 5/2006 | Morris |
| 2006/0184890 | A1 | 8/2006 | Altenhofen |
| 2006/0200780 | A1 | 9/2006 | Iwema et al. |
| 2006/0218086 | A1 | 9/2006 | Campbell et al. |
| 2007/0079250 | A1 | 4/2007 | Bump et al. |
| 2007/0100650 | A1 | 5/2007 | Ramer et al. |
| 2007/0106952 | A1 | 5/2007 | Matas et al. |
| 2007/0226614 | A1 | 9/2007 | Lorenzen et al. |
| 2007/0255689 | A1 | 11/2007 | Sun et al. |
| 2007/0276921 | A1 | 11/2007 | Riggs et al. |
| 2008/0005751 | A1 | 1/2008 | Chandra |
| 2008/0134093 | A1 | 6/2008 | Dharmarajan et al. |
| 2008/0195628 | A1 | 8/2008 | Kim |
| 2008/0228924 | A1 | 9/2008 | Herberger et al. |
| 2008/0301562 | A1* | 12/2008 | Berger et al. .................. 715/733 |
| 2009/0024953 | A1 | 1/2009 | Selig |
| 2009/0063415 | A1 | 3/2009 | Chatfield et al. |
| 2009/0083289 | A1 | 3/2009 | Morris |
| 2009/0100342 | A1 | 4/2009 | Jakobson |
| 2009/0256558 | A1 | 10/2009 | Fujita et al. |
| 2009/0259969 | A1 | 10/2009 | Pallakoff |
| 2009/0282361 | A1 | 11/2009 | Cortright |
| 2009/0286558 | A1 | 11/2009 | Zufi et al. |
| 2009/0298490 | A9 | 12/2009 | Janik |
| 2009/0309849 | A1 | 12/2009 | Iwema et al. |
| 2009/0319512 | A1* | 12/2009 | Baker et al. ....................... 707/5 |
| 2009/0319680 | A1 | 12/2009 | Owen et al. |
| 2010/0069035 | A1 | 3/2010 | Johnson |
| 2010/0174713 | A1 | 7/2010 | Baessler et al. |
| 2010/0179876 | A1 | 7/2010 | Holte |
| 2010/0192098 | A1 | 7/2010 | Kim |
| 2010/0332325 | A1 | 12/2010 | Holte |
| 2011/0078232 | A1 | 3/2011 | Van Den Driessche |
| 2011/0193780 | A1 | 8/2011 | Schaaf |
| 2012/0190386 | A1 | 7/2012 | Anderson |

OTHER PUBLICATIONS

Drew McLellan, "hCalendar in Endo", May 23, 2006, pp. 4.
"Microformats at Yahoo!—A Firefox 3 Opportunity", Jan. 7, 2008, Published—Jan. 2008, pp. 2.
Michael Kaply, "Operator 0.9.3", Copyright 2005-2008, May 23, 2008, pp. 5.
"BlueOrganizer Indigo Features", retrieved at << http://www.adaptiveblue.com/releases.html>>, May 26, 2008, pp. 3.
Mary Jo Foley, "IE 8 to Feature WebSlices, Activities", Published—Mar. 4, 2008, pp. 2.
"Accelerators in Internet Explorer 8 Beta 2", Retrieved from <http://www.code-magazine.com/Article.aspx?quickid=0811062> on Dec. 1, 2008., 2008, pp. 1-5.
Garrett "Ajax: A New Approach to Web Applications", Retrieved from: <http://www.adaptivepath.com/ideas/essays/archives/000385.php> on Nov. 28, 2008., Feb. 18, 2005, 6 Pages.
"Filename extension", Retrieved from <http://web.archive.org/web/20071202041958/http://en.wikipedia.org/wiki/Filename_extension> on Jan. 27, 2013, Dec. 1, 2007, 7 pages.
Final Office Action, U.S. Appl. No. 12/362,314, Jan. 5, 2012, 26 pages.
Final Office Action, U.S. Appl. No. 12/362,314, Feb. 22, 2013, 36 pages.
Non-Final Office Action, U.S. Appl. No. 12/362,314, Jul. 7, 2011, 18 pages.
Non-Final Office Action, U.S. Appl. No. 12/362,314, Oct. 15, 2012, 34 pages.
Non-Final Office Action, U.S. Appl. No. 12/362,314, Jul. 18, 2013, 41 pages.
"What's New for IE8 Search", Retrieved from http://blogs.msdn.com/ie/Default.aspx?p=2 on Dec. 1, 2008., 34 Pages.

* cited by examiner

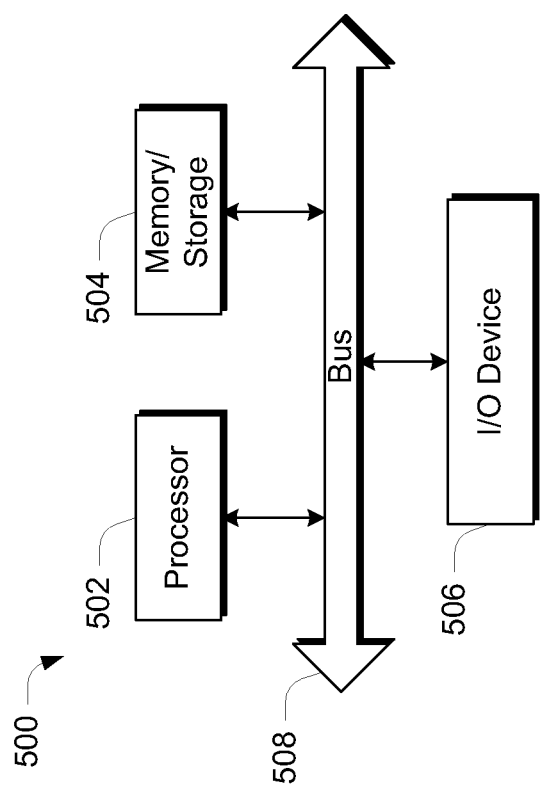

ACTIVITIES OPERATING ON STRUCTURED DATA

BACKGROUND

Activities are a way in which a user can access data from one webpage and invoke services of their choice provided by, for example, a service provider. For example, a user may select an address on one webpage, copy it and then select an activity called "map". The copied data can then be sent to a mapping service provider via the Web which, in turn, returns a displayable map for the user. Today activities only operate on unstructured data—i.e. data that can be considered as a text "blob" that is selected and copied by the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments can enable a webpage publisher to describe structured data on a webpage in a manner that enables a Web browser to intelligently present activities that pertain to user selections relative to the structured data appearing on the webpage. In at least some embodiments, a webpage publisher can provide markup that identifies structured data on a webpage. A service provider can provide a representation that describes the types of structured data in which it is interested, and how to handle the structured data responsive to a user selection. The Web browser can then use the markup in the webpage and the service provider's representation to identify activities associated with structured data selected by the user.

In at least some embodiments, activities can be presented to the user via a user interface in which activities associated with structured data are presented along with activities that are associated with unstructured data in an ordered form. In at least some embodiments, activities associated with structured data can be ordered and presented higher in a list than those activities that are associated with unstructured data.

Some embodiments can enable a user to make a partial selection within data comprising structured data in order to invoke presentation of activities associated with the structured data.

BRIEF DESCRIPTION OF THE DRAWINGS

The same numbers are used throughout the drawings to reference like features.

FIG. 5 is a block diagram of a system in accordance with one or more embodiments.

DETAILED DESCRIPTION

Overview

Various embodiments can enable a webpage publisher to describe structured data on a webpage in a manner that enables a Web browser to intelligently present activities that pertain to user selections relative to the structured data appearing on the webpage. In at least some embodiments, a webpage publisher can provide markup that identifies structured data on a webpage. A service provider can provide a representation that describes the types of structured data in which it is interested, and how to handle the structured data responsive to a user selection. The Web browser can then use the markup in the webpage and the service provider's representation to identify activities associated with structured data selected by the user.

In at least some embodiments, activities can be presented to the user via a user interface in which activities associated with structured data are presented along with activities that are associated with unstructured data in an ordered form. In at least some embodiments, activities associated with structured data can be ordered and presented higher in a list than those activities that are associated with unstructured data.

Some embodiments can enable a user to make a partial selection within data comprising structured data in order to invoke presentation of activities associated with the structured data. For example, a user may partially select an address associated with a location. By virtue of the fact that the address is annotated as structured data, various parameters which may not have been selected by the user can, nonetheless, be sent to a service provider so that a relevant activity can be performed relative to the structured data.

In the discussion that follows, a section entitled "Operating Environment" describes but one environment in which the various embodiments can be employed. Following this, a section entitled "Example Structured Data Description" describes an example structured data description in accordance with one or more embodiments. Following this, a section entitled "Example User Interface" describes an example user interface in accordance with one or more embodiments. Next, a section entitled "Example Methods" describes example methods in accordance with one or more embodiments. Following this, a section entitled "Extensions" describes various extensions in accordance with one or more embodiments. Last, a section entitled "Example System" is provided and describes an example system that can be used to implement one or more embodiments.

Operating Environment

Figure 1:
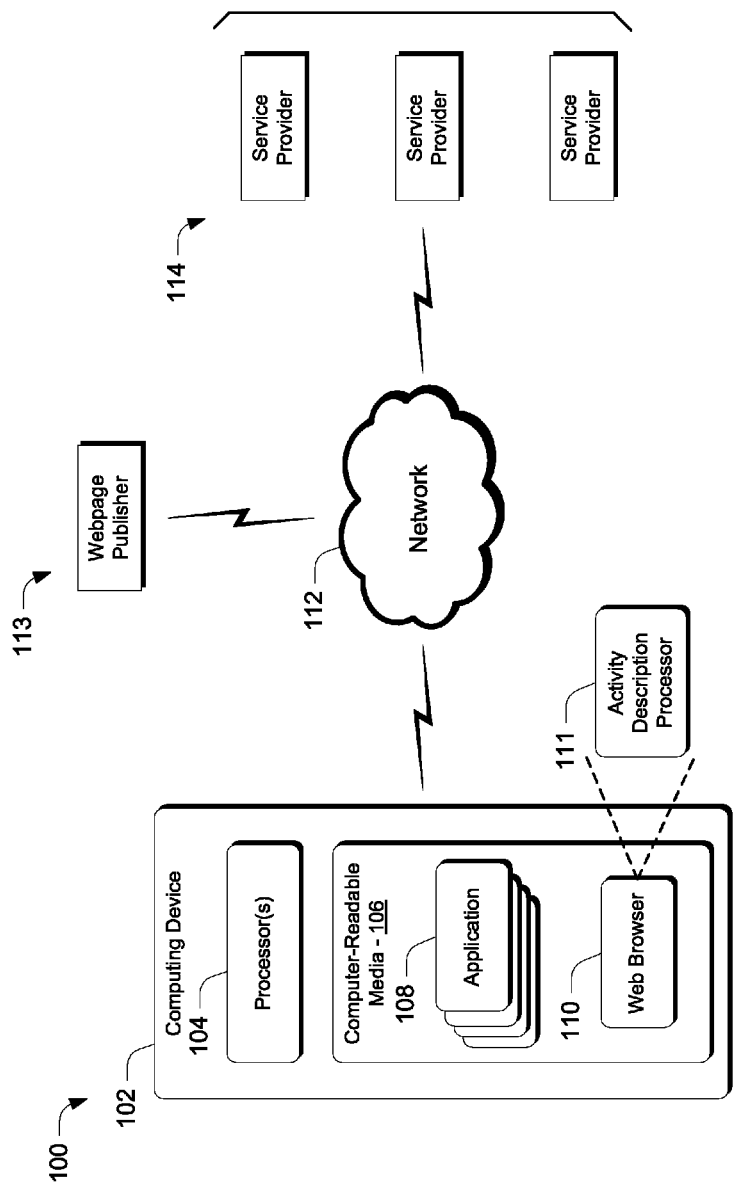
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application such as, by way of example and not limitation, reader applications, e-mail applications, instant messaging applications, and a variety of other applications. An application in the form of a Web browser 110 can include or otherwise make use of an activity description processor module 111 that operates as described above and below. The activity description processor module 111 can enable a Web browser to ascertain structured data types that can appear on webpage, as well as relevant parameters that are to be sent to a service provider for performance of a particular activity, as will become apparent below.

The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 5.

In addition, environment 100 includes a network 112, such as the Internet, one or more webpage publishers 113 and one or more service providers 114. In the illustrated and described embodiments, a webpage publisher can provide a description of structured data appearing on an authored webpage. Such description can be provided through a webpage's markup. A service provider can provide a description of structured data of interest, along with relevant parameters that are to be sent to the service provider upon invocation of an activity associated with the structured data. Thus, a webpage publisher 113 can describe structured data on a webpage in a manner that enables a Web browser to intelligently present activities that pertain to user selections relative to the structured data appearing on the webpage. In at least some embodiments, the service provider's description or representation can comprise XML markup that identifies structured data of interest that can appear on a webpage, parameters associated with data that can be used to provide an activity, and an address to which to send the data. Using the XML markup, the Web browser can provide various parameters to a service provider offering activities that pertain to the structured data.

In at least some embodiments, activities can be presented to user a via a user interface in which activities associated with structured data are presented along with activities that are associated with unstructured data in an ordered form. In at least some embodiments, activities associated with structured data can be ordered and presented higher in a list than those activities that are associated with unstructured data. Additionally, some embodiments can enable a user to make a partial selection within data comprising structured data in order to invoke presentation of activities associated with the structured data. For example, a user may partially select an address associated with a location. By virtue of the fact that the address is annotated as structured data, various parameters which may not have been selected by the user can, nonetheless, be sent to a service provider so that a relevant activity can be performed relative to the structured data.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of a structured data description that can be processed by an activity description processor such as activity description processor 111.

Example Structured Data Description

As noted above, a webpage publisher such as webpage publisher 113 can provide a description of structured data that appears on a webpage that they have authored. This description can appear in a webpage's markup. This markup informs the Web browser that there is structured data on a particular webpage.

A structured data description, separately provided by a service provider, can describe structured data of interest, relevant parameters associated with the structured data of interest, and an address to which to send data responsive to a user selection. In at least some embodiments, the structured data description can also provide information on how to process unstructured data that has been selected by the user. There may be multiple different service providers that have provided a structured data description that expresses an interest in the same structured data. The relevant parameters can then be used by a Web browser to invoke an activity provided by a service provider upon a user selection. Specifically, when a user makes a selection within a particular webpage, the Web browser can ascertain whether the user's selection is associated with structured data that is described in one or more structured data descriptions. If a user's selection is associated with structured data that is described in one or more structured data descriptions, then corresponding activities can be displayed in a user interface for a user to select. Upon selection of a corresponding activity, associated relevant parameters that are also described in the structured data description can be sent to a particular service provider associated with the selected activity. The service provider can then perform the activity and return whatever data is appropriate for the performed activity.

In addition, the structured data description can, but need not, describe parameters associated with unstructured data that can be the subject of an activity performed by a service provider. In those instances when a user's selection impacts both structured and unstructured data, the presented user interface can list for the user activities associated with both structured and unstructured data. Of course, in those instances where a user's selection does not impact unstructured data, the user interface can be used to present those activities that are associated with structured data.

Structured data refers to data that is in a format that can be utilized by the activity description processor 111. Structured data can be formatted in accordance with known or subsequently developed structured data standards, such as Extensible Markup Language (XML) or HyperText Markup Language (HTML). For example, the structured data can be described in a web page's HTML in a manner that identifies the data's particular data type. Specifically, in one or more embodiments, HTML tags can be utilized to associate a data type with a particular instance of data. Alternately or additionally, structured data can be formatted using other standards, both public and private without departing from the spirit and scope of the claimed subject matter.

An example of a structured data description that can be provided by a service provider appears just below. In the illustrated and described embodiment, structured data is described using an XML format. In the example just below, both structured and unstructured data that can appear on a webpage is described. Of course, it is possible for one or both of structured and unstructured data to be described.

```
<?xml version="1.0" encoding="utf-8" ?>
<openServiceDescription
xmlns="http://www.microsoft.com/schemas/openservicedescription/1.0">
<homepageUrl>http://maps.live.com</homepageUrl>
<display>
    <name>Map with Live Maps</name>
    <icon>http://www.live.com/favicon.ico</icon>
</display>
<activity category="Map">
    <activityAction context="address">
        <execute method="get"
        action="http://maps.live.com/default.aspx">
            <parameter name="street" value="{street-address}" />
            <parameter name="city" value="{region}" />
            <parameter name="zip" value="{postal-code} />
        </execute>
    </activityAction>
    <activityAction context="selection">
        <execute method="get"
        action="http://maps.live.com/default.aspx">
            <parameter name="where1" value="{selection}" />
        </execute>
    </activityAction>
```

-continued

```
</activity>
</openServiceDescription>
```

In the description just above, both structured and unstructured data are described. In the XML excerpt just above, starting from the bottom, there is a context="selection" that appears in the <activityAction> tag. This portion of the XML provides an address (in the <execute> tag) to which data is to be sent, along with parameters specified by a service provider, that are to be sent to them by a Web browser. In the parameters section, there is a {selection} variable that the Web browser fills in at the time of execution. The value inserted for {selection} is defined by a user's selection. For example, if the user selects an address and clicks a map activity, the browser makes an HTTP GET request and inserts the user's selection in the {selection} variable. This allows the service provider to execute the map activity on the data that is received responsive to the user's selection. This section is used for selections that pertain to unstructured data or data that is not marked up to indicate it as structured.

If, on the other hand, the user's selection pertains to structured data, in at least some embodiments, much more granular data can be sent to the service provider as specified in the XML. For example, using the above XML excerpt, if a publisher marks up the content in a particular way such as, for example, using "address" (which indicates structured data in the form of an address) in the first-appearing <activityAction> tag, then the service provider can specify specific variables they wish to be sent. For example, in the present XML excerpt, the service provider has specified parameters that include street address, region, and postal-code (or ZIP code).

In some cases, as noted above, the XML representation can include either or both of structured or unstructured data representations.

Having discussed an example structured data representation, consider now a discussion of an example user interface that can be utilized to display, for a user, activities that pertain to a user's selection.

Example User Interface

Figure 2:
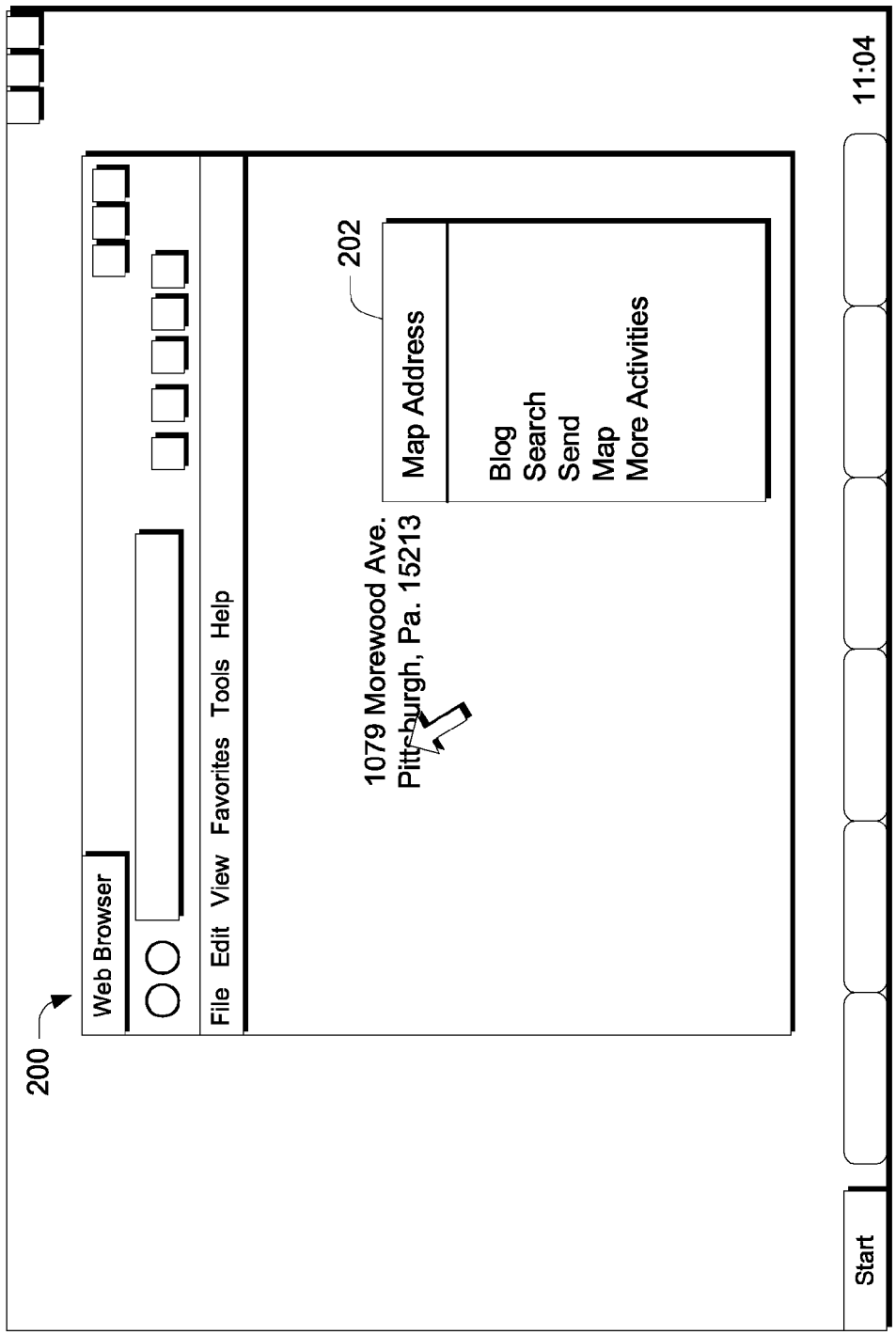
FIG. 2 illustrates an example Web browser user interface in accordance with one or more embodiments.

FIG. 2 illustrates an example Web browser user interface generally at 200. In this example, an address has been displayed for the user in a webpage. Assume, in this example, the user clicks on or otherwise selects the displayed address. Assume also that the publisher of the associated web content displayed in the Web browser has marked up the address to indicate that it is structured data. In this example, when a user clicks on or selects the associated address, the Web browser is knowledgeable that this content is structured data and, accordingly, by virtue of its classification as structured data and its associated type, the Web browser can identify activities that are relevant to the particular type of structured data that has been selected by the user. Responsively, the Web browser can display a list or menu 202 that includes activities that are relevant to the particular type of structured data that has been selected by the user. In this particular example, a "Map Address" activity has been identified as being relevant to the user's structured data selection. In addition, other relevant activities can be displayed for the user as well. These include, in this example, a blog activity, a search activity, a map activity, and a "More Activities" selection.

In some embodiments, a user may have selected less than the entire address such as, for example, clicking and dragging their cursor across the first line of the address. In these instances, the Web browser can recognize that the user may have intended to select the entire address. Since the user may have intended to select the entire address and, since the address has been marked up as structured data, activities that are relevant to the structured data can be displayed for the user. Additionally, because the user selected only a portion of the entire address, other activities that are relevant to unstructured data may be implicated as well. Accordingly, these partial selections can also be treated as unstructured data. Thus, in these instances, the list or menu 202 can display activities associated with both structured data and unstructured data.

Thus, activities can be presented to user via a user interface in which activities associated with structured data can be presented along with activities that are associated with unstructured data in an ordered form. In at least some embodiments, activities associated with structured data can be ordered and presented higher in a list than those activities that are associated with unstructured data.

Having described an example user interface in accordance with one or more embodiments, consider now a discussion of some example methods in accordance with one or more embodiments.

Example Methods

Figure 3:
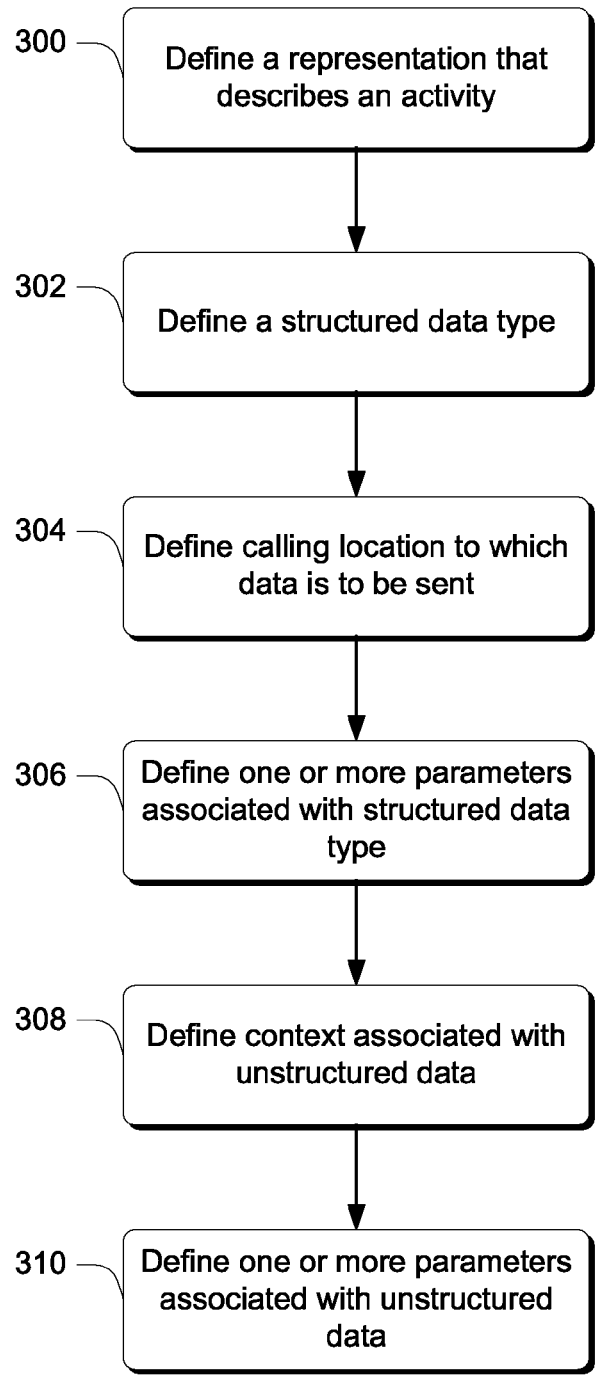
FIG. 3 is a flow diagram that describes steps in a method in accordance with one or more embodiments.

FIG. 3 is a flow diagram that describes a method in accordance with one or more embodiments. The method can be implemented in any suitable hardware, software, firmware, or combination thereof. In at least some embodiments, the method can be implemented by software executing or executable by a service provider that offers one or more activities.

Step 300 defines a representation that describes an activity. Any suitable representation can be used. In at least some embodiments, the representation can comprise an XML representation such as one that is similar to the one described above. Step 302 defines one or more structured data types. One example of how this can be done is described above. Step 304 defines a calling location such as an address to which data is to be sent. An example of how this can be done is provided above. The address can be a remote address or, alternately, a local location such as a local code invocation. Step 306 defines one or more parameters associated with the structured data type(s). Any suitable parameters can be used. In at least some embodiments, the defined parameters are used to identify data that is to be sent to the service provider responsive to a user selection.

In at least some embodiments, step 308 defines a context associated with unstructured data. An example of how this can be done is provided above. Specifically, the defined context in the example above comprises a user's selection. Step 310 defines one or more parameters associated with the unstructured data. Any suitable parameters can be used. In at least some embodiments, the defined parameters are used to identify data that is to be sent to the service provider responsive to a user selection.

Figure 4:
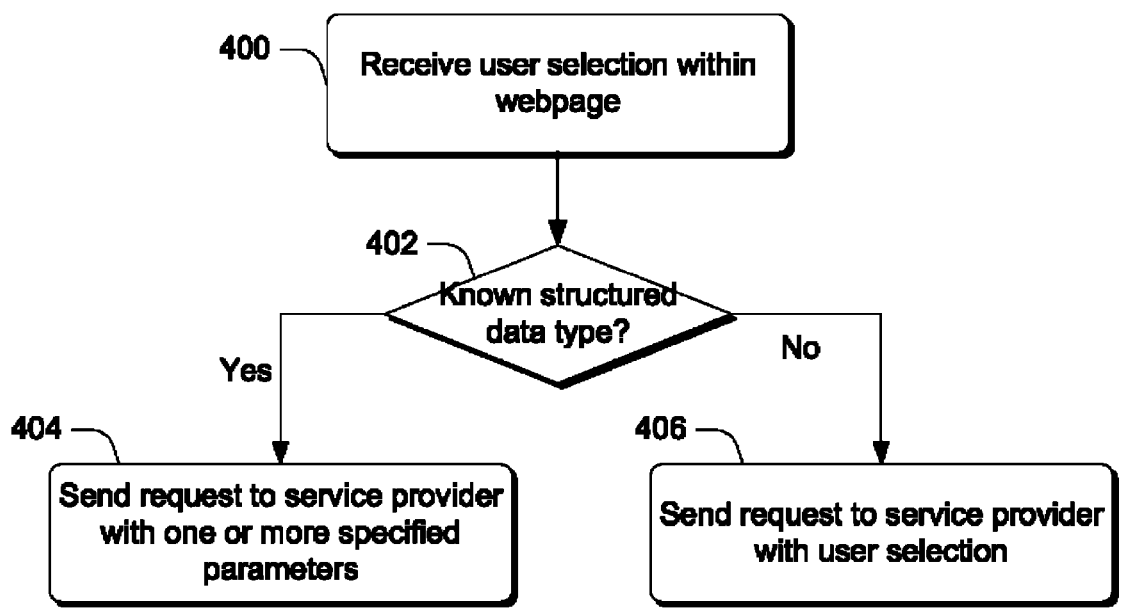
FIG. 4 is a flow diagram that describes steps in a method in accordance with one or more embodiments.

FIG. 4 is a flow diagram that describes a method in accordance with one or more embodiments. The method can be implemented in any suitable hardware, software, firmware, or combination thereof. In at least some embodiments, the method can be implemented by a suitably-configured Web browser.

Step 400 receives a user selection within a webpage. This step can be performed in any suitable way. For example, in at least some embodiments, a user's selection can be made using an input device such as a mouse. Step 402 ascertains whether the user's selection pertains to a known structured data type.

The step can be performed in any suitable way. For example, in at least some embodiments, this step can be performed by ascertaining whether the user's selection is associated with content that has been marked up to indicate the content is structured data having a structured data type. If a user's selection is associated with structured data, then step 404 sends a request to a service provider with one or more specified parameters. The parameters that are specified can be specified in the markup that describes the activity. An example of markup is provided above. When the service provider receives the request from the Web browser, the service provider can then provide an associated activity using the parameters that were sent in the Web browser's request. If, on the other hand, the user's selection does not correspond to a known structured data type at step 402, step 406 can send a request to a service provider with the user's selection. When the service provider receives the request from the Web browser, the service provider can then provide an associated activity using the user's selection.

Extensions

In one or more embodiments, a Web browser can be extended to include data recognizers that recognize new and/or different types of structured data. These data recognizers can be used to extend the functionality of the activity description processor module 111 (FIG. 1). This can provide a degree of flexibility and adaptability to deal with new and evolving structured data definitions.

In at least some embodiments, extended data recognizers can be described in a declarative format description, such as through XML. Alternately or additionally, extended data recognizers can be provided through a script browser add-on. Alternately or additionally, a binary browser add-on can be provided to extend data recognizers.

In one or more embodiments, a browser add-on that deals with new data types can include the following properties. First, the add-on can provide a top-level name of the format. In the first example above, this can be done through the XML description. In the last two examples, the extensions can register with the browser through the usual installation mechanisms, for example, by calling an install API or writing into the registry, to provide information on the format that the add-on is to handle. Second, the add-on can provide a way to discover structured data on webpage. In the first example, this can be done through a simple CSS selector statement. In the last two examples, this can be handled through method calls. Third, the add-on can provide a way to select/get property values for the structured data. In the first example, this can be done through a simple CSS selector statement. In the last two examples, this can be handled through method calls.

Having discussed various embodiments for handling both structured and unstructured data, consider now a discussion of an example system that can be utilized to implement the above-described embodiments.

Example System

FIG. 5 illustrates an example computing device 500 that can implement the various embodiments described above. Computing device 500 can be, for example, computing device 102 of FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments can enable a webpage publisher to describe structured data on a webpage in a manner that enables a Web browser to intelligently present activities that pertain to user selections relative to the structured data appearing on the webpage. In at least some embodiments, a webpage publisher can provide markup that identifies structured data on a webpage. A service provider can provide a representation that describes the types of structured data in which it is interested, and how to handle the structured data responsive to a user selection. The Web browser can then use the markup in the webpage and the service provider's representation to identify activities associated with structured data selected by the user.

In at least some embodiments, activities can be presented to the user via a user interface in which activities associated with structured data are presented along with activities that are associated with unstructured data in an ordered form. In at least some embodiments, activities associated with structured data can be ordered and presented higher in a list than those activities that are associated with unstructured data.

Some embodiments can enable a user to make a partial selection within data comprising structured data in order to invoke presentation of activities associated with the structured data.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter

What is claimed is:

1. A method, implemented at a computer system that includes one or more processors, for invoking an activity of a service provider based on structured data of web content, the method comprising:
   rendering web content within a user interface, the web content including structured data that is identified as being of a particular structured data type, the rendering including presenting the structured data at the user interface in a user-selectable manner;
      receiving a user selection of at least a portion of the structured data;
   based at least on receiving the user selection, and based at least on the structured data having been identified in the web content as being of the particular structured data type, identifying at least one structured data description that corresponds to the particular structured data type, the at least one structured data description defining an activity that is provided by a service provider, including defining at least:
      (i) one or more structured data types, including the particular structured data type, that are associated with the activity;
      (ii) a calling location to which data is to be sent when invoking the activity; and
      (iii) one or more parameters to be included when calling the calling location as part of invoking the activity; and
   based at least on receiving the user selection, and based at least on identifying the at least one structured data description,
      presenting a menu that lists a plurality of activities that are relevant to the user selection and that include activities associated with both structured data and unstructured data, the plurality of activities including the activity that is provided by the service provider; and
      invoking the activity that is provided by the service provider, including:
         identifying, based on the particular structured data type, one or more
         portions of the structured data to use as the one or more parameters; and
         calling the calling location using the one or more portions of the structured data as the one or more parameters.

2. The method of claim 1, wherein the at least one structured data description comprises XML, and wherein the structured data is formatted according to XML.

3. The method of claim 1, wherein the at least one structured data description also defines a context associated with identifying unstructured data as relating to the at least one structured data description, along with one or more additional parameters to be included when calling the calling location as part of invoking the activity in connection with the unstructured data.

4. The method of claim 1, wherein the at least one structured data description defines an HTTP GET request that is to be used to send data to the service provider.

5. The method of claim 1, wherein the calling location comprises a Web address.

6. The method of claim 1, wherein identifying, based on the particular structured data type, one or more portions of the structured data to use as the one or more parameters comprises using markup in the web content, in which the one or more parameters are specified as part of a definition of the structured data, according to the particular structured data type.

7. The method of claim 1, wherein the plurality of activities are ordered based on whether they are associated with structured data or unstructured data.

8. The method of claim 1, wherein those activities associated with structured data appear above those activities associated with unstructured data in the menu.

9. The method of claim 1, wherein the user selection of the at least a portion of the structured data comprises less than an entire portion of the structured data, and wherein identifying, based on the particular structured data type, the one or more portions of the structured data to use as the one or more parameters comprises using the entire portion of the structured data in spite of the user selection being of only the portion of the structured data.

10. A system
   comprising: one or more hardware processors; and
   one or more computer-readable storage media having stored thereon computer-executable instructions that are executable by the one or more processors to configure the system to invoke an activity of a service provider based on structured data of web content, the computer-executable instructions including instructions that are executable to configure the system to perform at least the following:
   render web content within a user interface, the web content including structured data that is identified as being of a particular structured data type, the rendering including presenting the structured data at the user interface in a user-selectable manner;
      receive a user selection of at least a portion of the structured data;
   based at least on receiving the user selection, and based at least on the structured data having been identified in the web content as being of the particular structured data type, identify at least one structured data description that corresponds to the particular structured data type, the at least one structured data description defining an activity that is provided by a service provider, including defining at least:
      (i) one or more structured data types, including the particular structured data type, that are associated with the activity;
      (ii) an address to which data is to be sent when invoking the activity; and
      (iii) one or more parameters to be sent to the address as part of invoking the activity; and
   based at least on receiving the user selection, and based at least on identifying the at least one structured data description,
      present a menu that lists a plurality of activities that are relevant to the user selection and that include activities associated with both structured data and unstructured data, the plurality of activities including the activity that is provided by the service provider; and invoke the activity that is provided by the service provider, by at least:
identifying, based on the particular structured data type, one or more portions of the structured data to use as the one or more parameters; and
sending the one or more portions of the structured data to the address as the one or more parameters.

11. The system of claim 10, wherein the at least one structured data description comprises an XML description, and wherein the structured data is formatted according to XML.

12. The system of claim 10, wherein the at least one structured data description further comprises a description of where to send data selected by a user when the selected data user comprises unstructured data.

13. The system of claim 10, wherein the at least one structured data description also defines a context associated with identifying unstructured data as relating to the at least one structured data description, along with one or more additional parameters to be included when calling the calling location as part of invoking the activity in connection with the unstructured data.

14. The system of claim 10, wherein the computer-executable instructions also include instructions that are executable to configure the system to use markup in the web content when identifying the one or more portions of the structured data to use as the one or more parameters comprises, in which the one or more parameters are specified as part of a definition of the structured data, according to the particular structured data type.

15. The system of claim 10, wherein those activities associated with structured data appear above those activities associated with unstructured data in the menu.

16. The system of claim 10, wherein the user selection of the at least a portion of the structured data comprises less than an entire portion of the structured data, and wherein the computer-executable instructions also include instructions that are executable to configure the system to use the entire portion of the structured data in spite of the user selection being of only the portion of the structured data when identifying the one or more portions of the structured data to use as the one or more parameters.

17. A computer program product comprising one or more hardware storage devices having stored thereon computer-executable instructions that are executable by one or more processors to configure a computer system to invoke an activity of a service provider based on structured data of web content, the computer-executable instructions including instructions that are executable to configure the computer system to perform at least the following:
render web content within a user interface, the web content including structured data that is identified as being of a particular structured data type, the rendering including presenting the structured data at the user interface in a user-selectable manner;
receive a user selection of at least a portion of the structured data;
based at least on receiving the user selection, and based at least on the structured data having been identified in the web content as being of the particular structured data type, identify at least one structured data description that corresponds to the particular structured data type, the at least one structured data description defining an activity that is provided by a service provider, including defining at least:
(i) one or more structured data types, including the particular structured data type, that are associated with the activity;
(ii) an address to which data is to be sent when invoking the activity; and
(iii) one or more parameters to be sent to the address as part of invoking the activity; and
based at least on receiving the user selection, and based at least on identifying the at least one structured data description,
present a menu that lists a plurality of activities that are relevant to the user selection and that include activities associated with both structured data and unstructured data, the plurality of activities including the activity that is provided by the service provider; and
invoke the activity that is provided by the service provider, by at least:
identifying, based on the particular structured data type, one or more
portions of the structured data to use as the one or more parameters; and
sending the one or more portions of the structured data to the address as the one or more parameters.

18. The computer program product of claim 17, wherein the at least one structured data description also defines a context associated with identifying unstructured data as relating to the at least one structured data description, along with one or more additional parameters to be included when calling the calling location as part of invoking the activity in connection with the unstructured data.

19. The computer program product of claim 17, wherein those activities associated with structured data appear above those activities associated with unstructured data in the menu.

20. The computer program product of claim 17, wherein the user selection of the at least a portion of the structured data comprises less than an entire portion of the structured data, and wherein the computer-executable instructions also include instructions that are executable to configure the system to use the entire portion of the structured data in spite of the user selection being of only the portion of the structured data when identifying the one or more portions of the structured data to use as the one or more parameters.

* * * * *